(12) United States Patent
    Graham

(10) Patent No.: US 9,422,013 B2
(45) Date of Patent: Aug. 23, 2016

(54) MODULAR TRAILER SYSTEM AND METHOD

(71) Applicant: Kevin Paul Graham, Birds Landing, CA (US)

(72) Inventor: Kevin Paul Graham, Birds Landing, CA (US)

( * ) Notice: Subject to any disclaimer, the term of this patent is extended or adjusted under 35 U.S.C. 154(b) by 0 days.

(21) Appl. No.: 13/971,663

(22) Filed: Aug. 20, 2013

(65) Prior Publication Data

US 2015/0054256 A1    Feb. 26, 2015

(51) Int. Cl.
| | |
|---|---|
| *B62D 53/06* | (2006.01) |
| *B62D 21/12* | (2006.01) |
| *B62D 21/20* | (2006.01) |
| *B60P 3/06* | (2006.01) |
| *B60P 3/40* | (2006.01) |

(52) U.S. Cl.
 CPC ............. *B62D 53/061* (2013.01); *B60P 3/06* (2013.01); *B60P 3/40* (2013.01); *B62D 21/12* (2013.01); *B62D 21/20* (2013.01); *B62D 53/065* (2013.01)

(58) Field of Classification Search
 CPC .. B62D 53/061; B62D 53/062; B62D 53/064; B62D 53/065
 USPC ...................................................... 280/441.2
 See application file for complete search history.

(56) References Cited

U.S. PATENT DOCUMENTS

| | | | | |
|---|---|---|---|---|
| 2,531,694 | A | | 11/1950 | Larsen |
| 2,996,206 | A | * | 8/1961 | McKee ..................... 414/631 |
| 3,253,668 | A | * | 5/1966 | Tantlinger ............ B60P 1/6418 180/11 |
| 3,450,283 | A | * | 6/1969 | Helland ..................... 414/474 |
| 3,645,559 | A | | 2/1972 | Stafford, Jr. |
| 3,697,098 | A | | 10/1972 | Fisher |
| 4,530,411 | A | * | 7/1985 | Grinwald ........... B62D 53/0864 180/11 |
| 6,767,172 | B2 | * | 7/2004 | French ..................... B60P 1/43 414/481 |
| 6,821,066 | B2 | | 11/2004 | Wehrli |
| 7,112,029 | B1 | * | 9/2006 | Neatherlin ............... B60P 3/40 280/404 |

\* cited by examiner

*Primary Examiner* — Joseph Rocca
*Assistant Examiner* — Felicia L Brittman
(74) *Attorney, Agent, or Firm* — Steven R. Vosen

(57) ABSTRACT

A modular trailer system is described, wherein a gooseneck, deck, and dolly are attachable to each other in a variety of ways. One configuration allows the gooseneck and dolly to be attached to either end of the deck. Another configuration allows the gooseneck and dolly to be attached directly to each other. This permits the method of transporting a deck to a site, and then returning the gooseneck and dolly to another location.

10 Claims, 21 Drawing Sheets

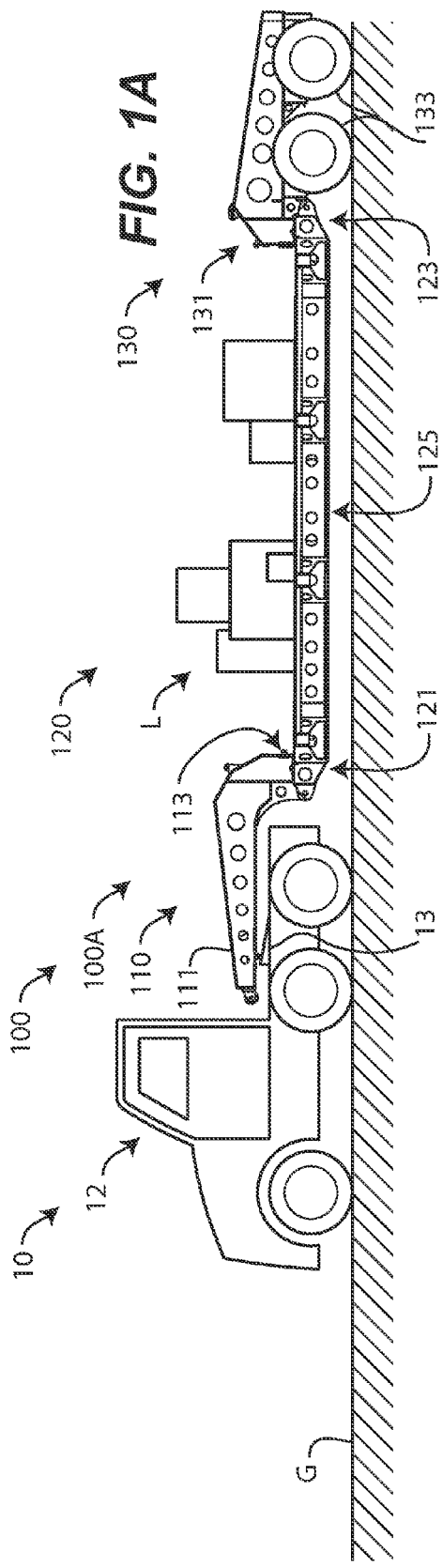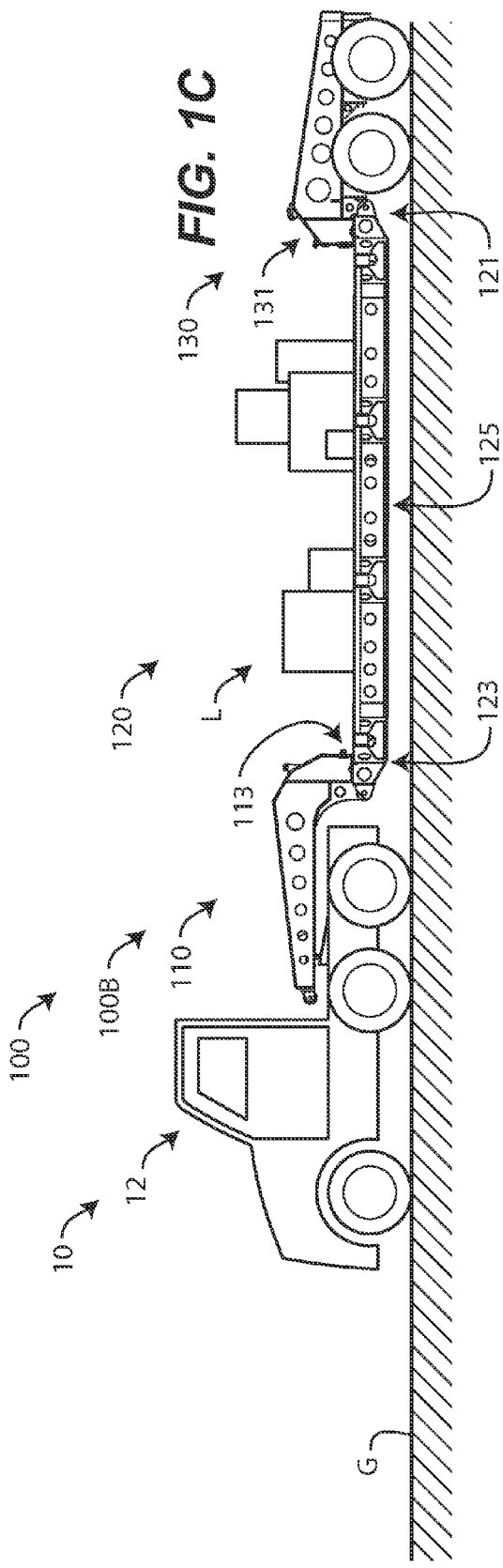

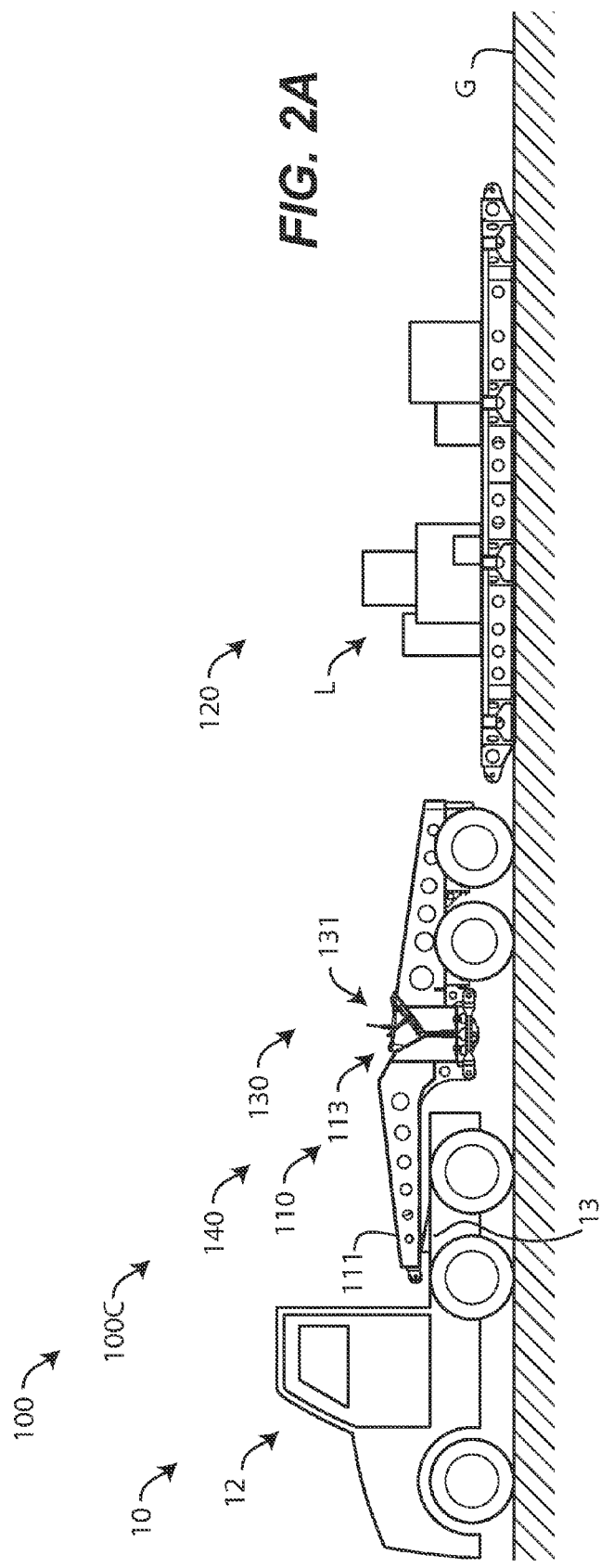

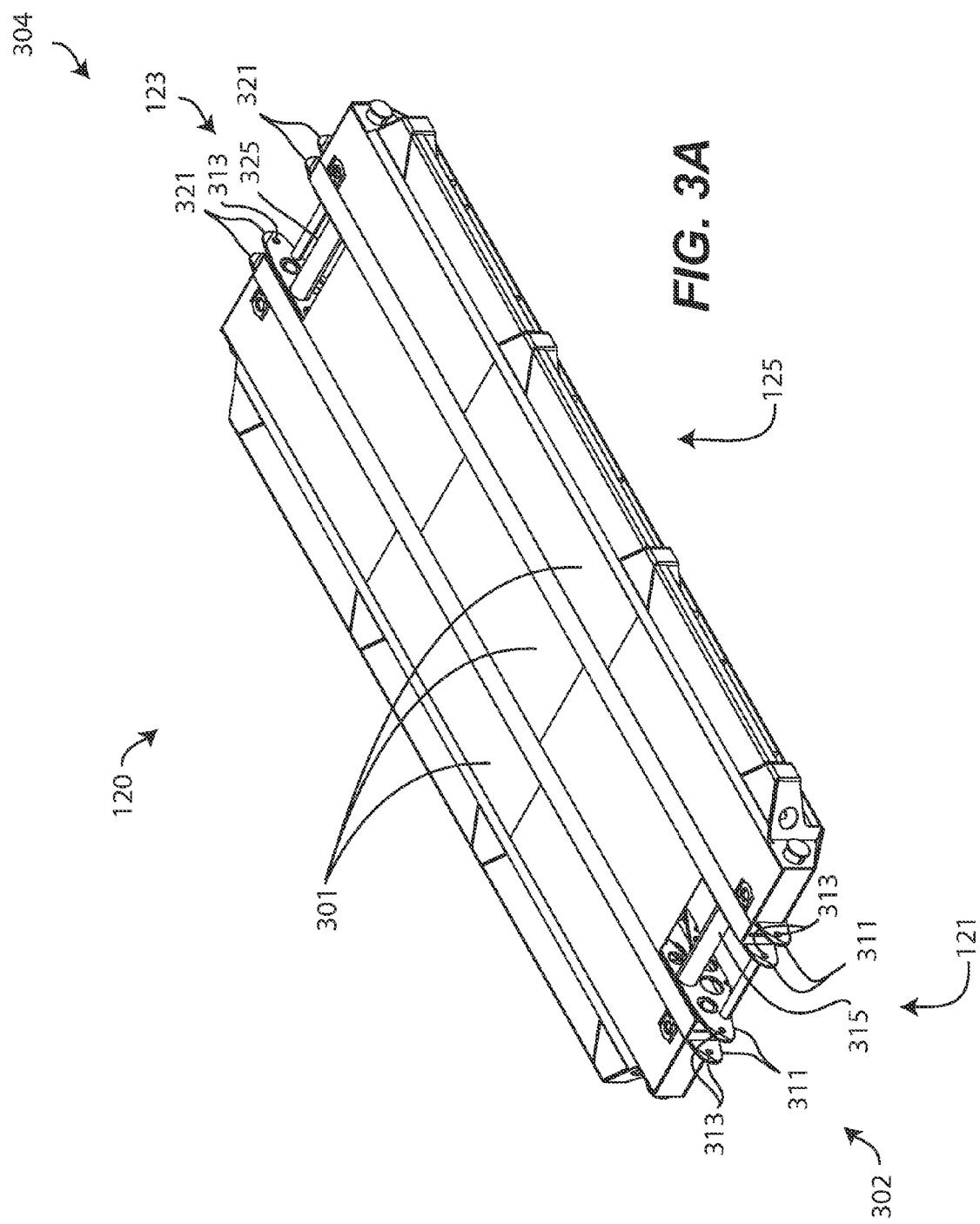

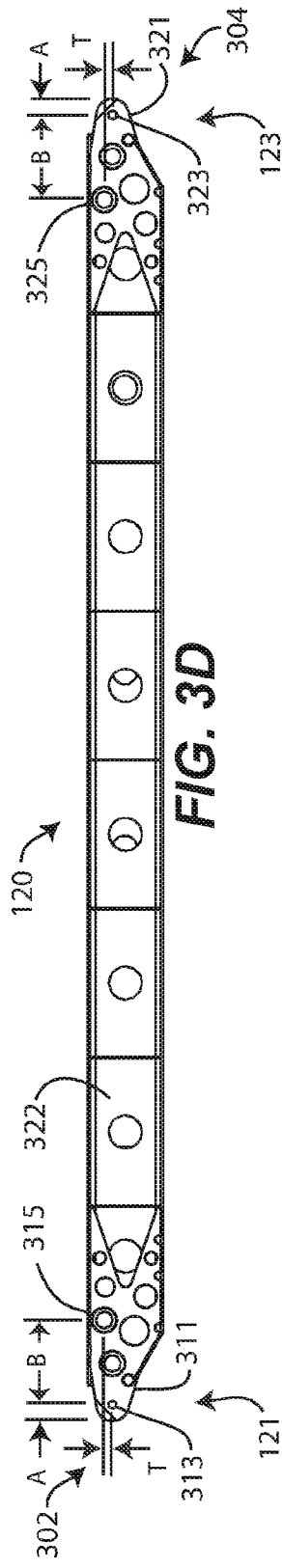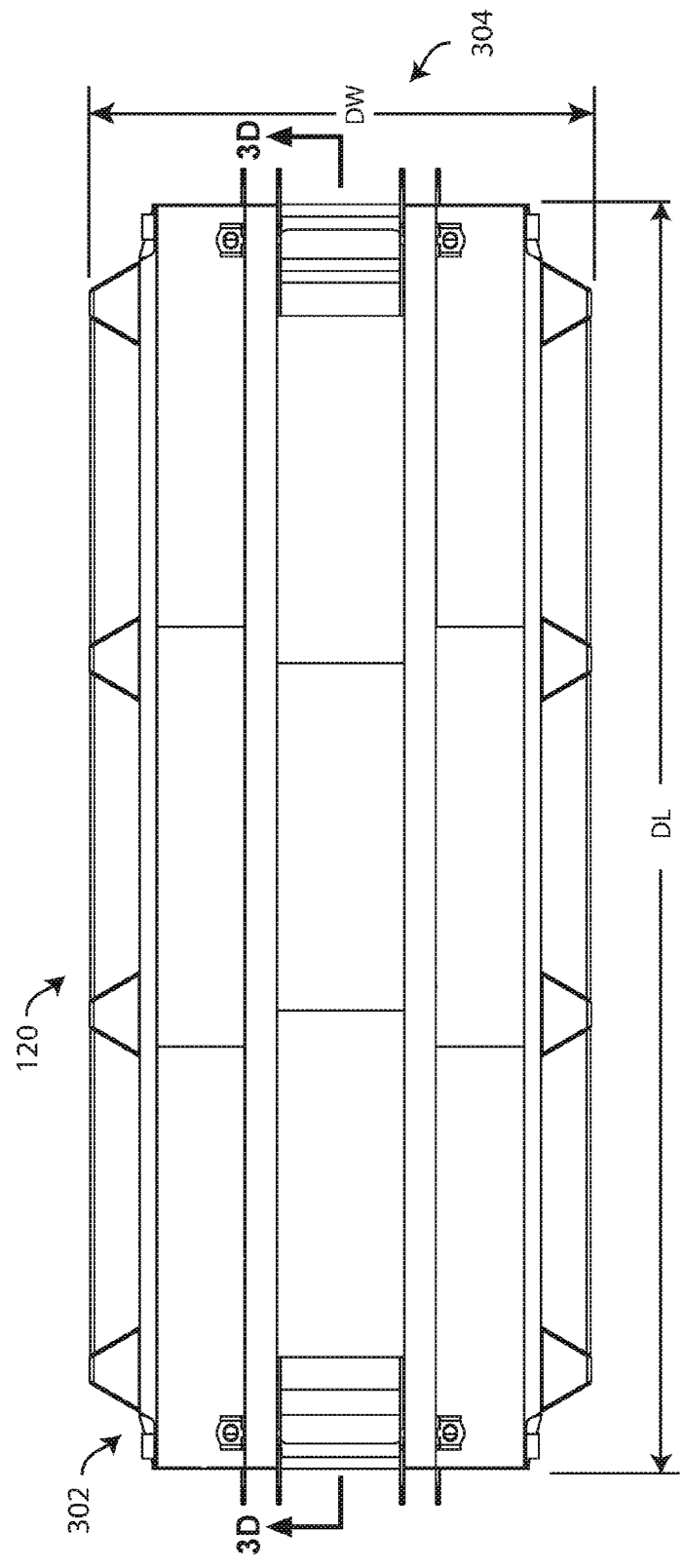

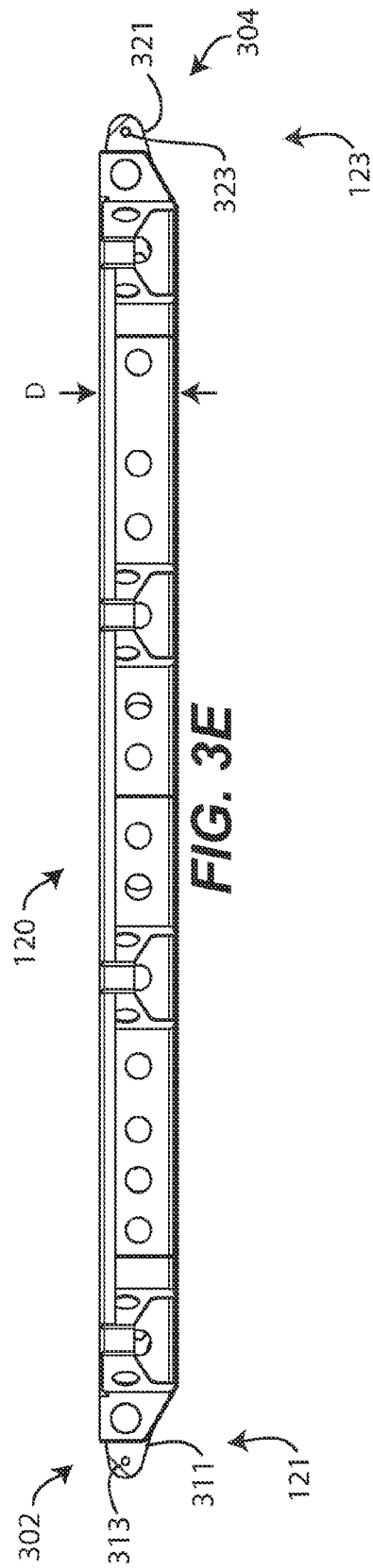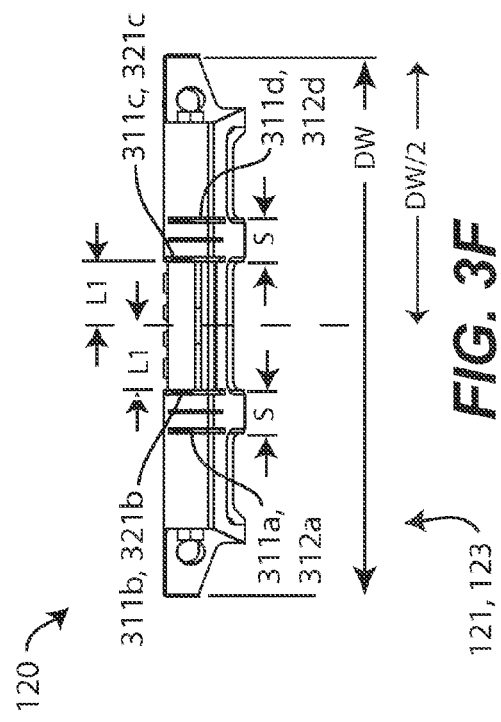

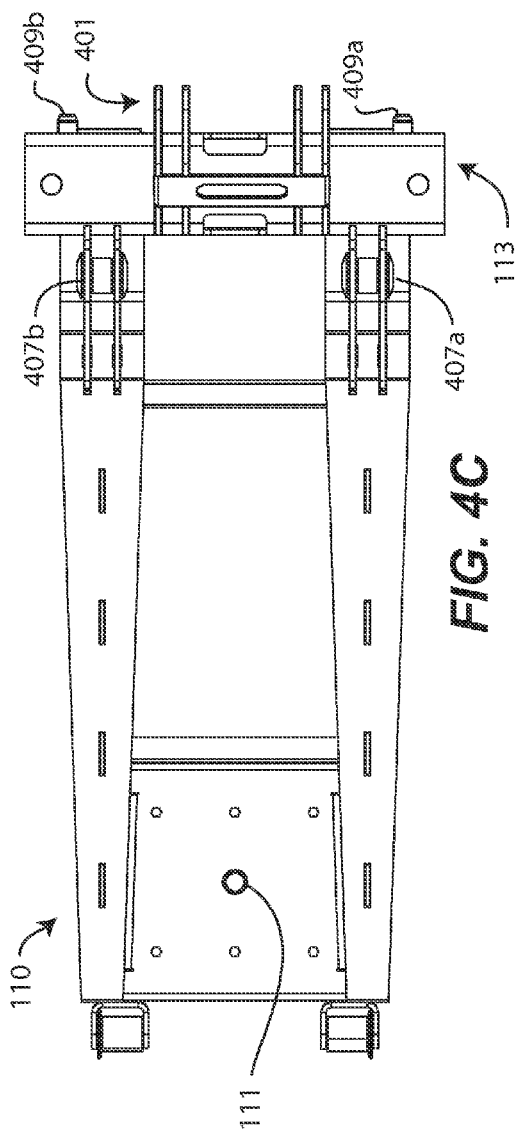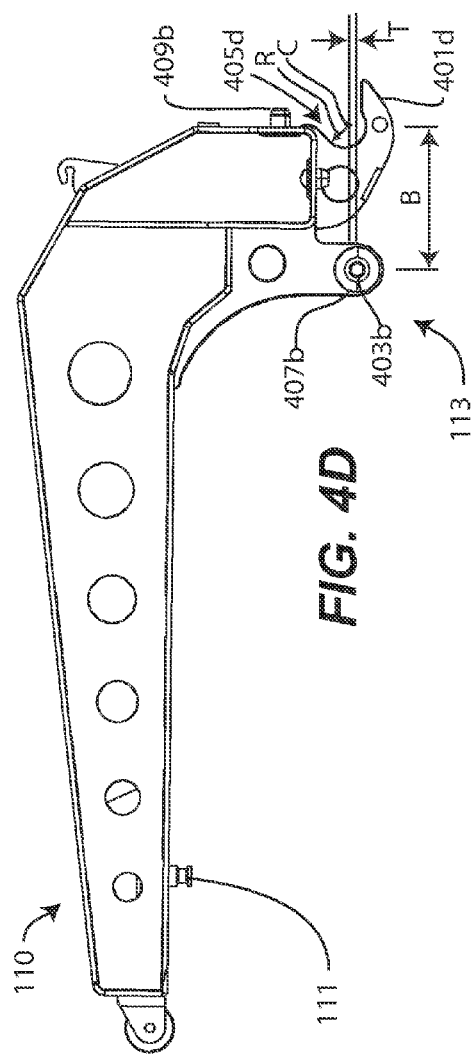

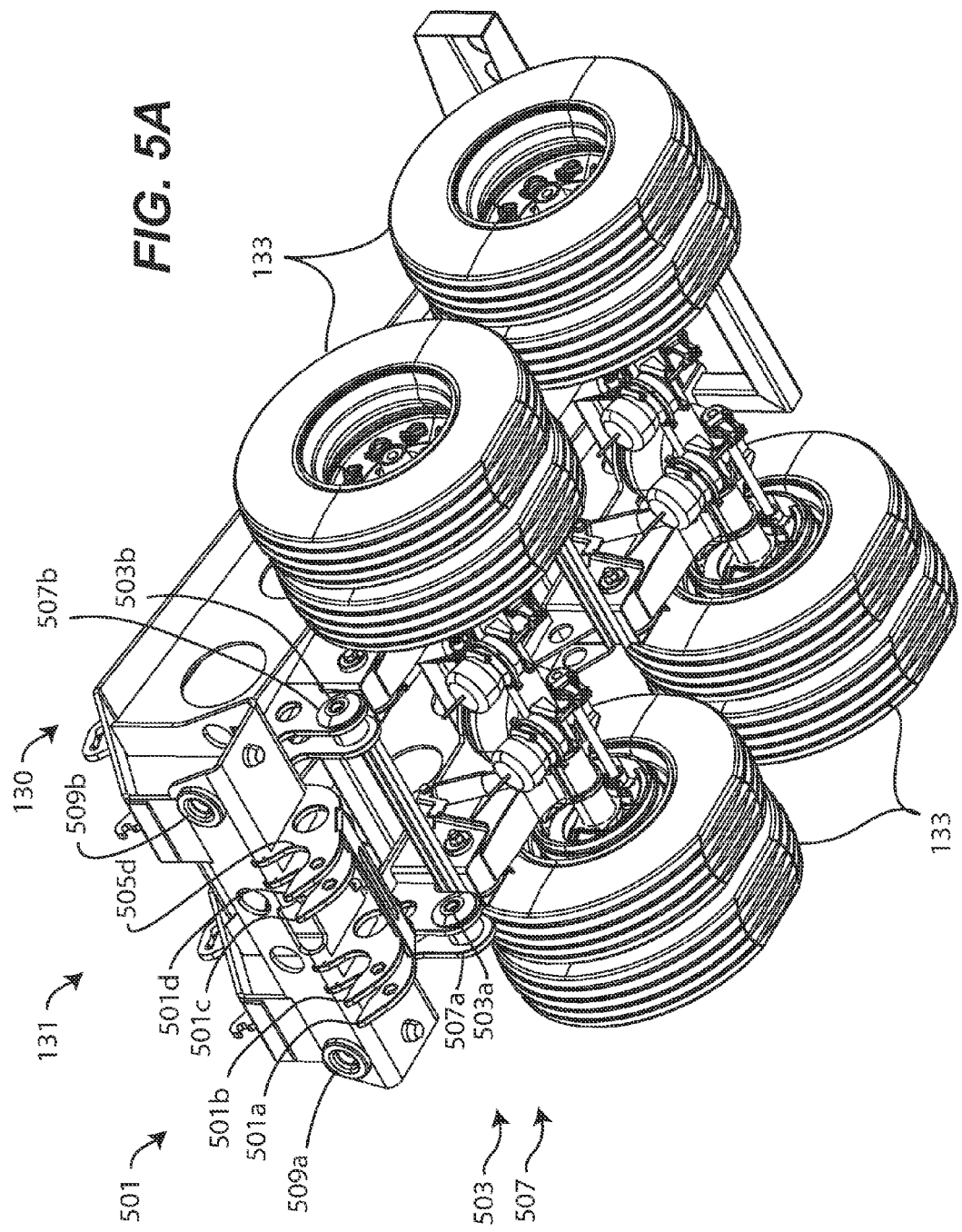

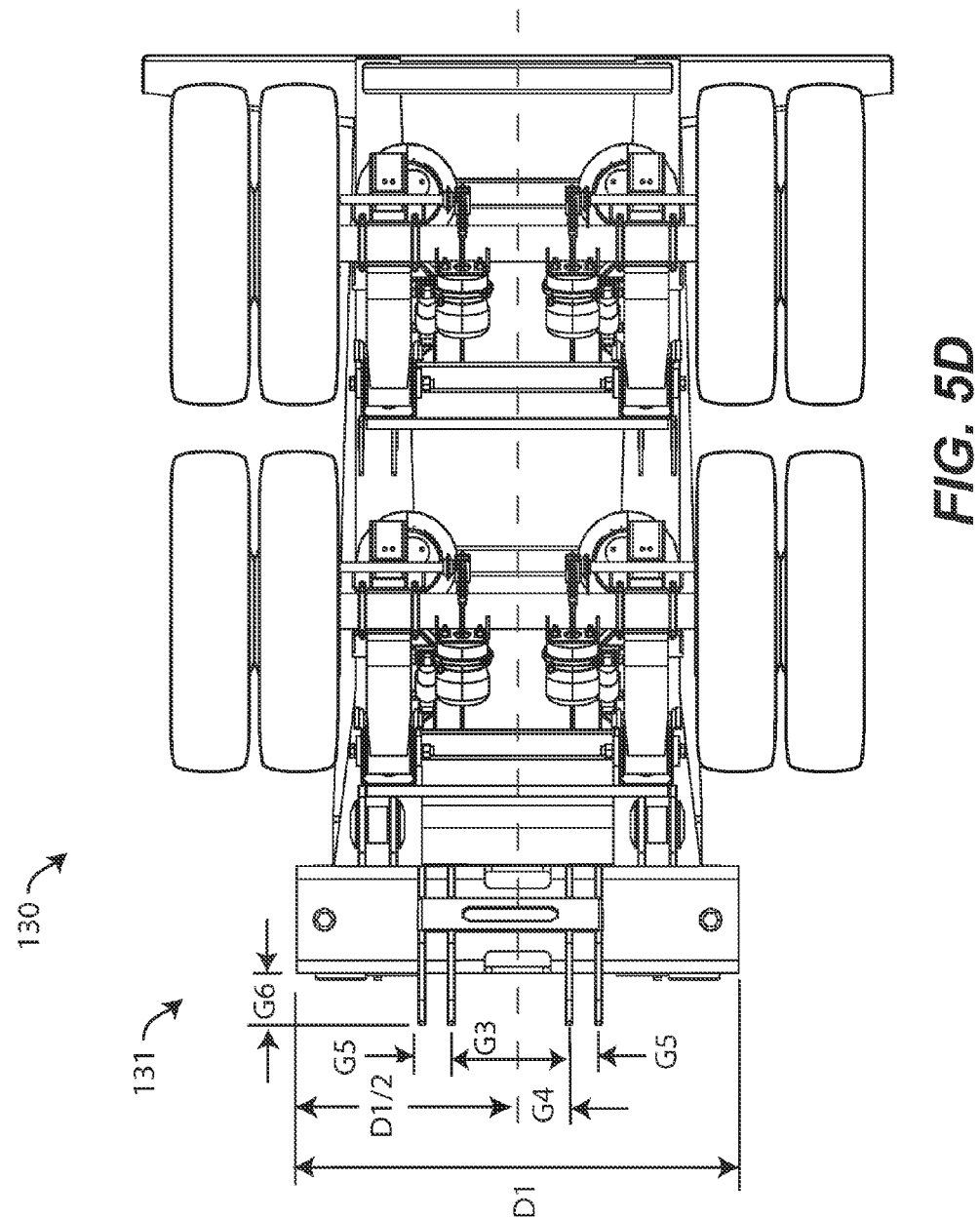

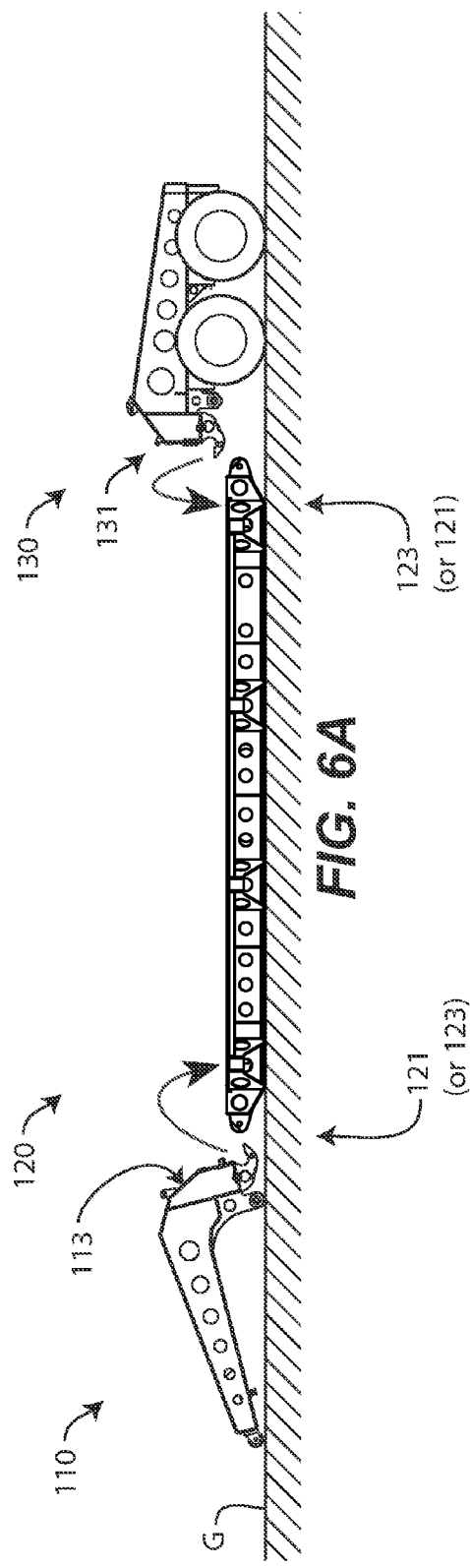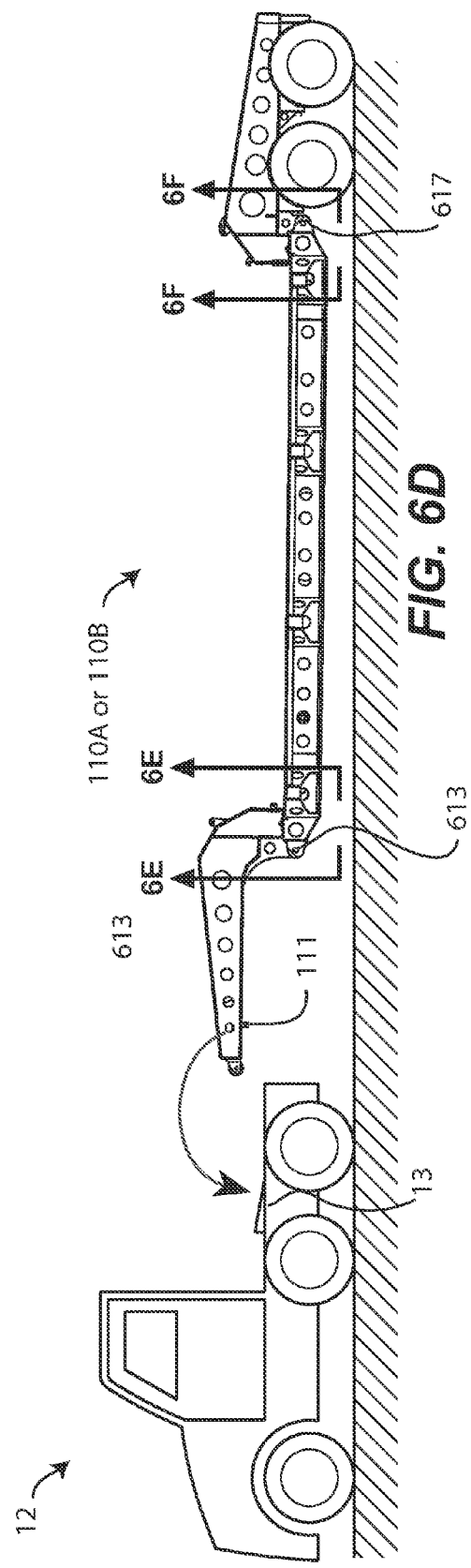

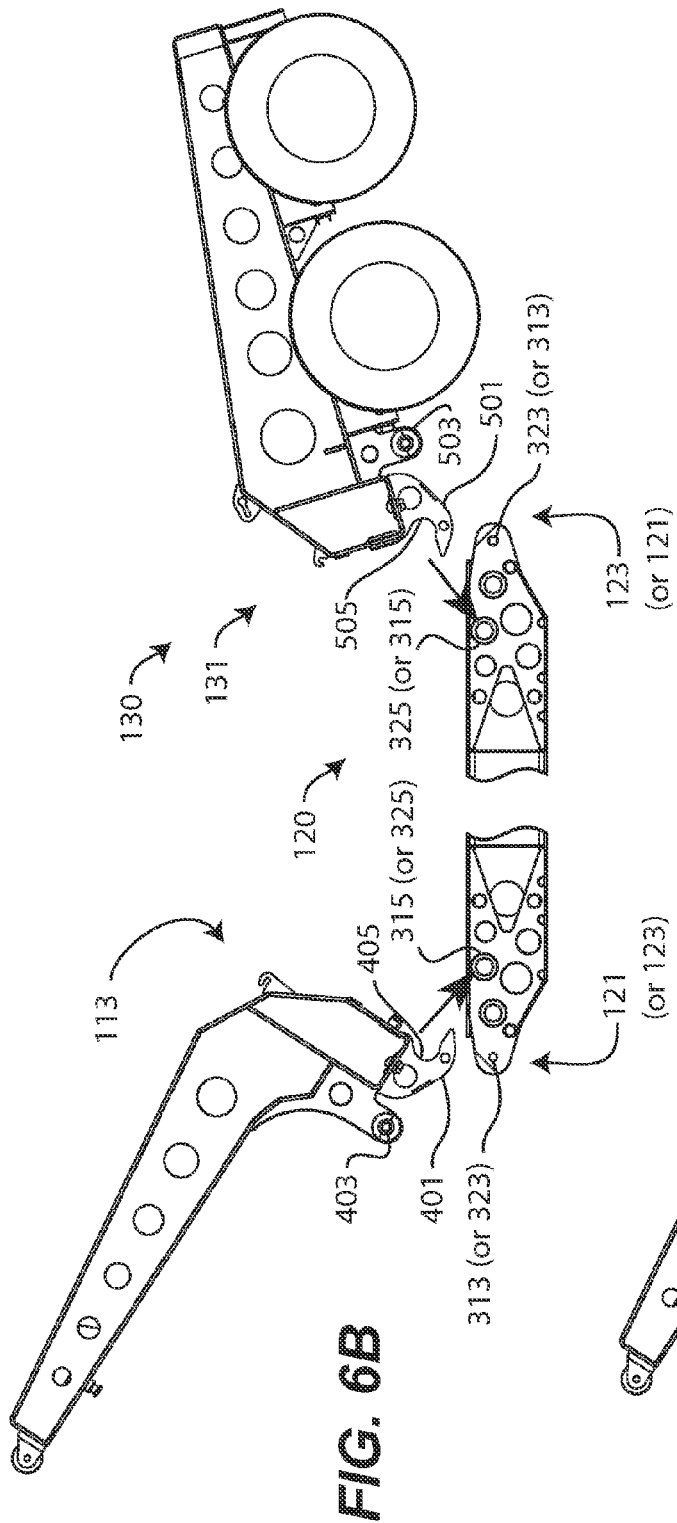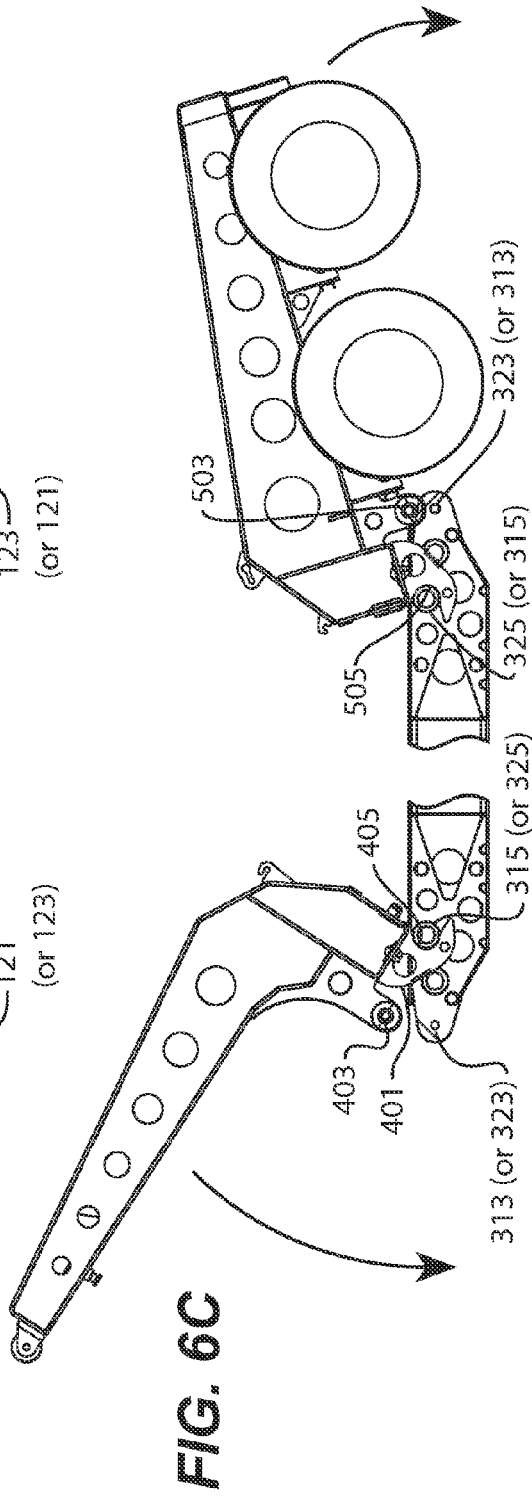

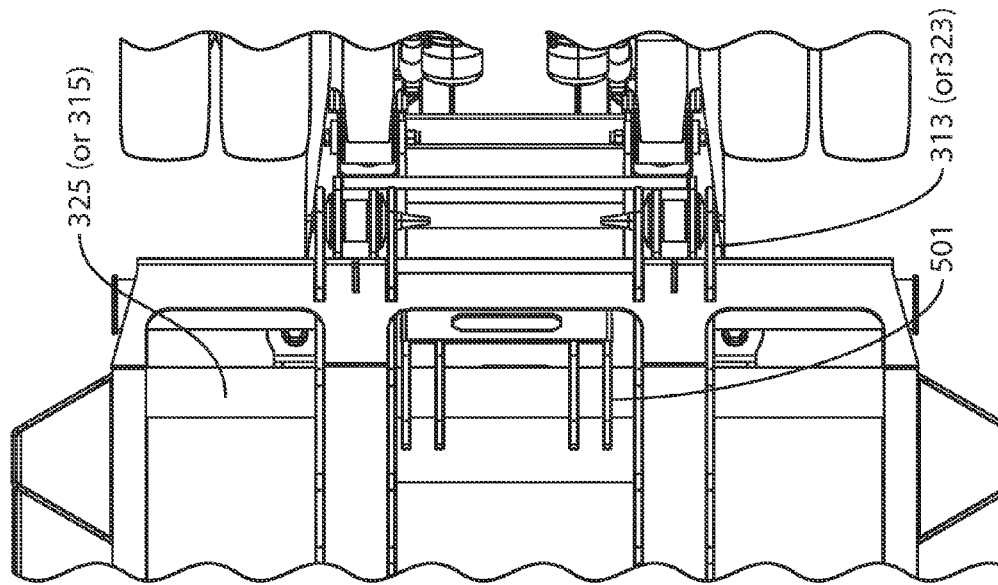
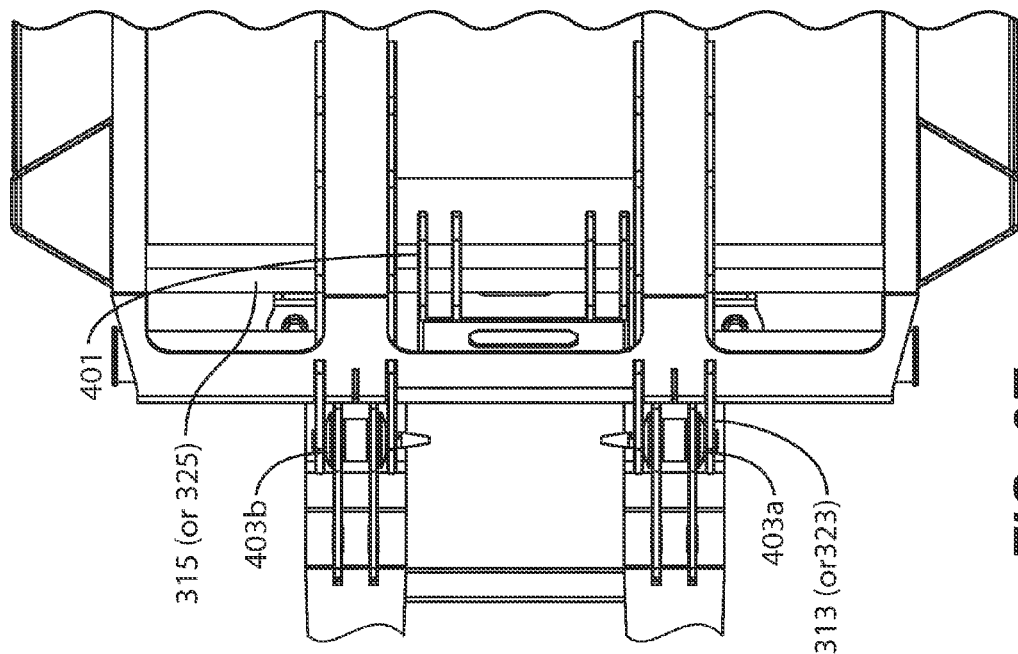

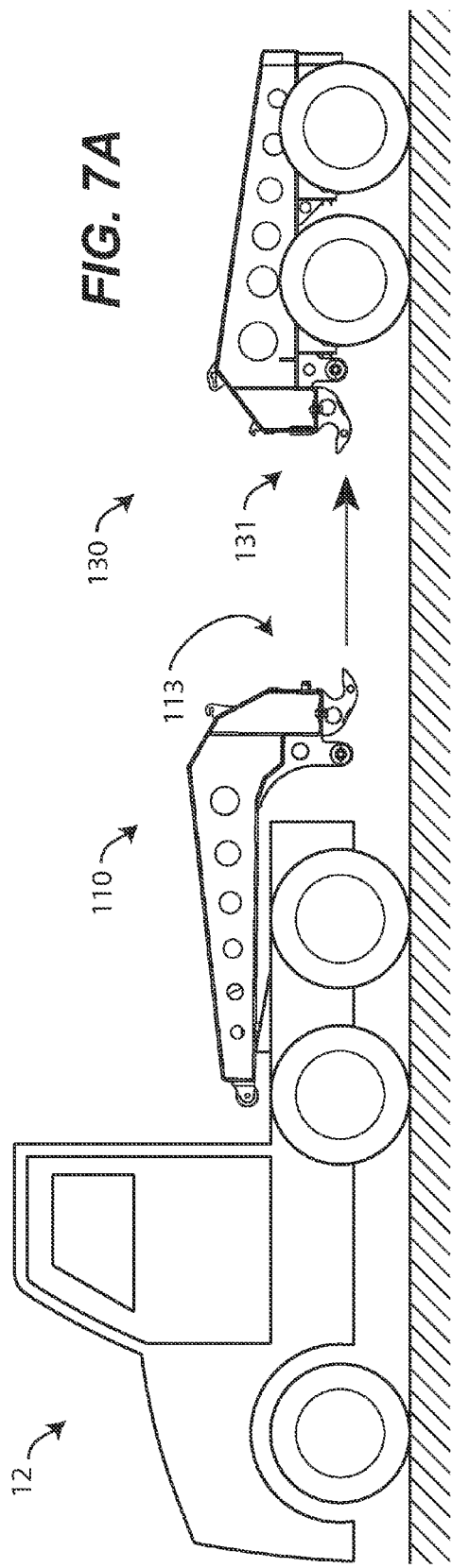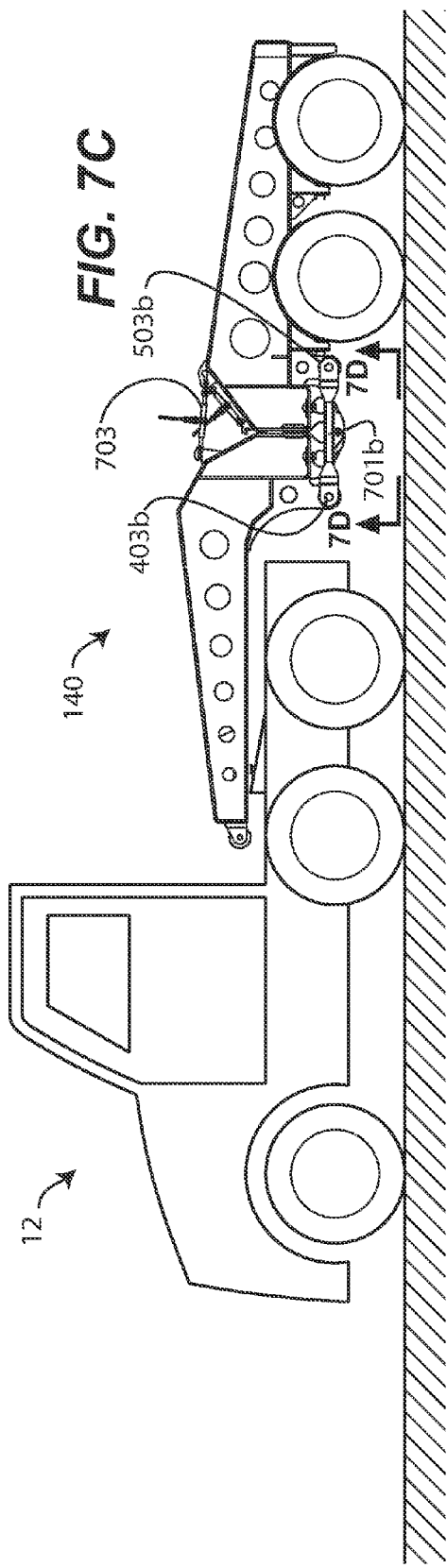

MODULAR TRAILER SYSTEM AND METHOD

BACKGROUND OF THE INVENTION

1. Field of the Invention

The present invention generally relates to trailers, and more particularly to a modular trailer system and method of using the system.

2. Discussion of the Background

Transporting very large equipment, such as drilling equipment, required specially designed large flatbed trailers. Typical of such trailers are "lowboy" trailers, which have a gooseneck at the front for attaching to a tractor, a dolly at the rear with wheels, and a large flat deck that extends between the gooseneck and dolly.

It is common for a load to be transported and left at a remote site for long periods of time. It is also common for a load to be integrated into the trailer deck, requiring that the trailer also be left at the remote site. This may be problematic since the trailer cannot be used for any other purpose. In addition, the trailer is often left exposed to the environment for long periods of time and components, such as the brakes, cannot be serviced.

There is a need for a trailer that can be used to transport loads to remote sites while permitting the use or servicing of trailer components. Such a trailer should be compatible with other trailer systems, such as being pitchable to a standard truck hitch.

BRIEF SUMMARY OF THE INVENTION

The present invention overcomes the disadvantages of prior art trailers by providing a system of modular trailer components. In one embodiment, the components can form a trailer for hauling a load, such as a lowboy. In another embodiment, the deck of the trailer may be detached from a gooseneck and dolly, permitting the deck to be left at a remote location. In yet another embodiment, the gooseneck and dolly may be attached to each other without the deck, permitting the gooseneck and dolly to be returned for servicing or storage, or for use to haul other decks.

In certain embodiments, a deck is provided for use with a modular trailer assembly. The deck includes a first deck end, a second deck end, one or more structural elements extending longitudinally along the length between the first deck end to the second deck end, a first cross-member member located near the first deck end, where the first cross-member is joined to at least one of the one or more structural elements and a second cross-member located near the second deck end, where the second cross-member is joined to at least one of the one or more structural elements.

In certain other embodiments, at least a portion of the first cross-member and the second cross-member have a cross-sectional shape of the arc of a circle, and the portion of the first cross-member and the second cross-member is accessible through the deck.

In certain embodiments, a modular trailer assembly is provided comprising a deck, a gooseneck and a dolly. The deck include a first deck end, a second deck end, one or more structural elements extending longitudinally along the length between the first deck end to the second deck end, a first cross-member located near the first deck end, where the first cross-member is joined to at least one of the one or more structural elements, and a second cross-member located near the second deck end, where the second cross-member is joined to at least one of the one or more structural elements. The gooseneck includes a hook, where the hook of the gooseneck is removably connectable the first cross-member. The dolly includes a hook, where the hook of the dolly is removably connectable to the second cross-member.

In certain other embodiments, trailer components for attaching to a tractor are provided, including a gooseneck and a dolly. The gooseneck and the dolly are both removably attachable to a deck, and the gooseneck and the dolly are removably connectable to each other.

In certain embodiments, a method of transporting modular trailer system components are provided comprising: transporting a trailer, where the trailer includes separable gooseneck, deck, and dolly components; decoupling the deck from the gooseneck and the dolly; coupling the gooseneck to the dolly; and transporting the coupled gooseneck and dolly separate from the deck.

In certain other embodiments, a method of transporting modular trailer system components is provided comprising: transporting a coupled gooseneck and dolly to a deck; decoupling the gooseneck and the dolly; coupling the gooseneck to a first end of the deck; and coupling the dolly to a second end of the deck.

These features together with the various ancillary provisions and features which will become apparent to those skilled in the art from the following detailed description, are attained by the trailer system and method of the present invention, preferred embodiments thereof being shown with reference to the accompanying drawings, by way of example only, wherein:

BRIEF DESCRIPTION OF THE SEVERAL VIEWS OF THE DRAWING

FIGS. 1A-1C are views of a first and second configuration of a first embodiment trailer system, where FIG. 1A is a side view of a first configuration, FIG. 1B is a side view of a second configuration, and FIG. 1C is a top left perspective view of the first or second configuration;

FIGS. 2A and 2B are views of the trailer system of FIG. 1A in a third configuration, where FIG. 2A is a side view, and FIG. 2B is a top right perspective view;

FIGS. 3A-3F are views of a first embodiment deck of the trailer system of FIG. 1A, where FIG. 3A is a top left perspective view, FIG. 3B is a bottom right perspective view, FIG. 3C is a top view, FIG. 3D is sectional side view 3D-3D of FIG. 3C, FIG. 3E is a side view, and FIG. 3F is an end view;

FIGS. 4A-4E are views of a first embodiment gooseneck of the trailer system of FIG. 1A, where FIG. 4A is bottom left perspective view, FIG. 4B is a top view, FIG. 4C is a bottom view, FIG. 4D is a left side view, and FIG. 4E is a back view;

FIG. 5A-5D are views of a first embodiment dolly of the trailer system of FIG. 1A, where FIG. 5A is bottom left perspective view, FIG. 5B is left side view, FIG. 5C is a front view, and FIG. 5D is a bottom side view;

FIGS. 6A-6F are views of the trailer system of FIG. 1A or 1C, where FIG. 6A is a disassembled trailer system, and FIGS. 6B and 6C are side views illustrating the gooseneck and dolly being attached to the deck, FIG. 6D is a side view of the trailer system being attached to a tractor, FIG. 6E is a bottom view 6E-6E of FIG. 6l) of the attached gooseneck and deck, and FIG. 6F is a bottom view 6F-6F of FIG. 6D of the attached deck and dolly; and FIGS. 7A-7D are views of the third configuration of FIG. 2A, where FIG. 7A is a side view illustrating connecting the gooseneck and dolly, FIG. 7B is a front left perspective view illustrating connecting the gooseneck and dolly, FIG. 7C is a detailed view of FIG. 2B, and FIG. 7D is bottom view 7D-7D of FIG. 7C of the attached gooseneck and dolly.

Figure 1B:
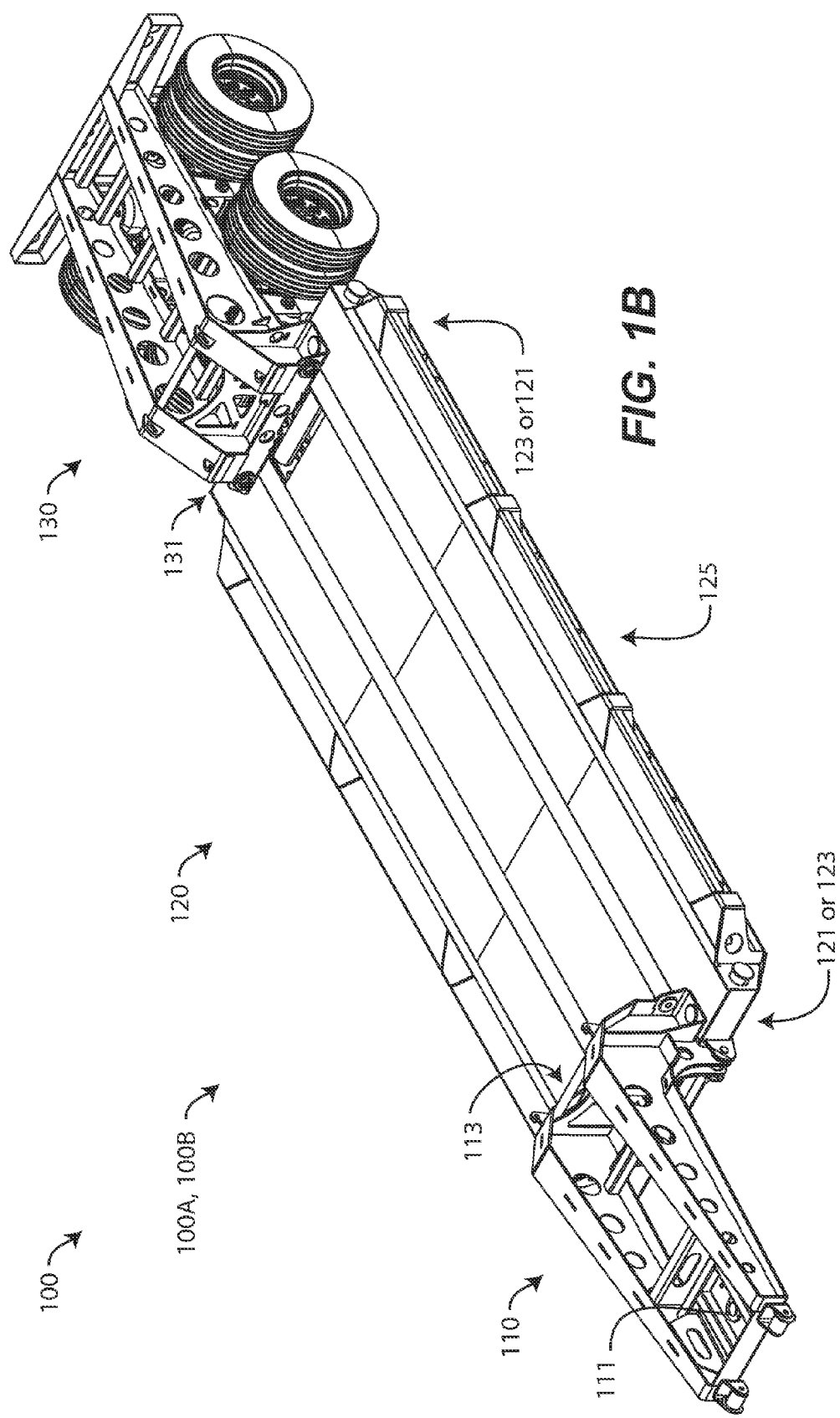

Reference symbols are used in the Figures to indicate certain components, aspects or features shown therein, with reference symbols common to more than one Figure indicating like components, aspects or features shown therein.

DETAILED DESCRIPTION OF THE INVENTION

FIG. 1A is a side view of a tractor trailer 10 including a first embodiment trailer system 100 in a first configuration 100A attached to a tractor 12. Tractor 12, is in general, a prior art tractor which is sometimes referred to as the road tractor portion of a tractor trailer truck. Tractor 12 may, for example, include a fifth wheel 13 adapted to couple tractor 12 to a component of trailer system 100.

Trader system 100 is modular and may be used in several configurations. In the example of FIG. 1A, a first configuration 100A is a lowboy that is formed by connecting the following components: a gooseneck 110, a deck 120, and a dolly 130. With first configuration 100A attached to tractor 12, as in FIG. 1A, a load L may be transported on a road on the ground C.

The component names (gooseneck, deck, and dolly) are not limiting and are chosen in reference to their place in the configuration 100A. As discussed subsequently, these individual components may be arranged as in FIG. 1A, or in different configurations by attaching the components differently.

More specifically, as described in greater detail below: gooseneck 110 includes a coupling pin 111 for attaching to a tractor and a gooseneck connector 113; deck 120 includes a first deck connector 121, a second deck connector 123, and a deck portion 125; and dolly 130 includes a dolly connector 131 and wheels 133. In the embodiment of FIG. 1A, gooseneck connector 113 is attached to first deck connector 121 and second deck connector 123 is attached to dolly connector 131.

In certain embodiments, gooseneck 110 and dolly 130 are adapted to be connected to either one of first deck connector 121 or second deck connector 123, permitting either end of the deck to face the trailer. Thus, for example, FIG. 1B is a side view of a second configuration 100B of the trailer system 100 of FIG. 1A, where deck 120 is arranged for transport in a direction opposite that of FIG. 1A. The difference configuration 100A of FIG. 1A and configuration 100B of FIG. 1B is that, in configuration 100A, gooseneck connector 113 is attached to first deck connector 121 and second deck connector 123 is attached to dolly connector 131, while in configuration 100B, gooseneck connector 113 is attached to second deck connector 123 and first deck connector 121 is attached to dolly connector portion 131.

FIG. 1C is a perspective view of the trailer of FIGS. 1A and 1B, showing that either deck connector (121 or 123) may be attached to either of gooseneck connector 113 or dolly connector 131.

Figure 2B:
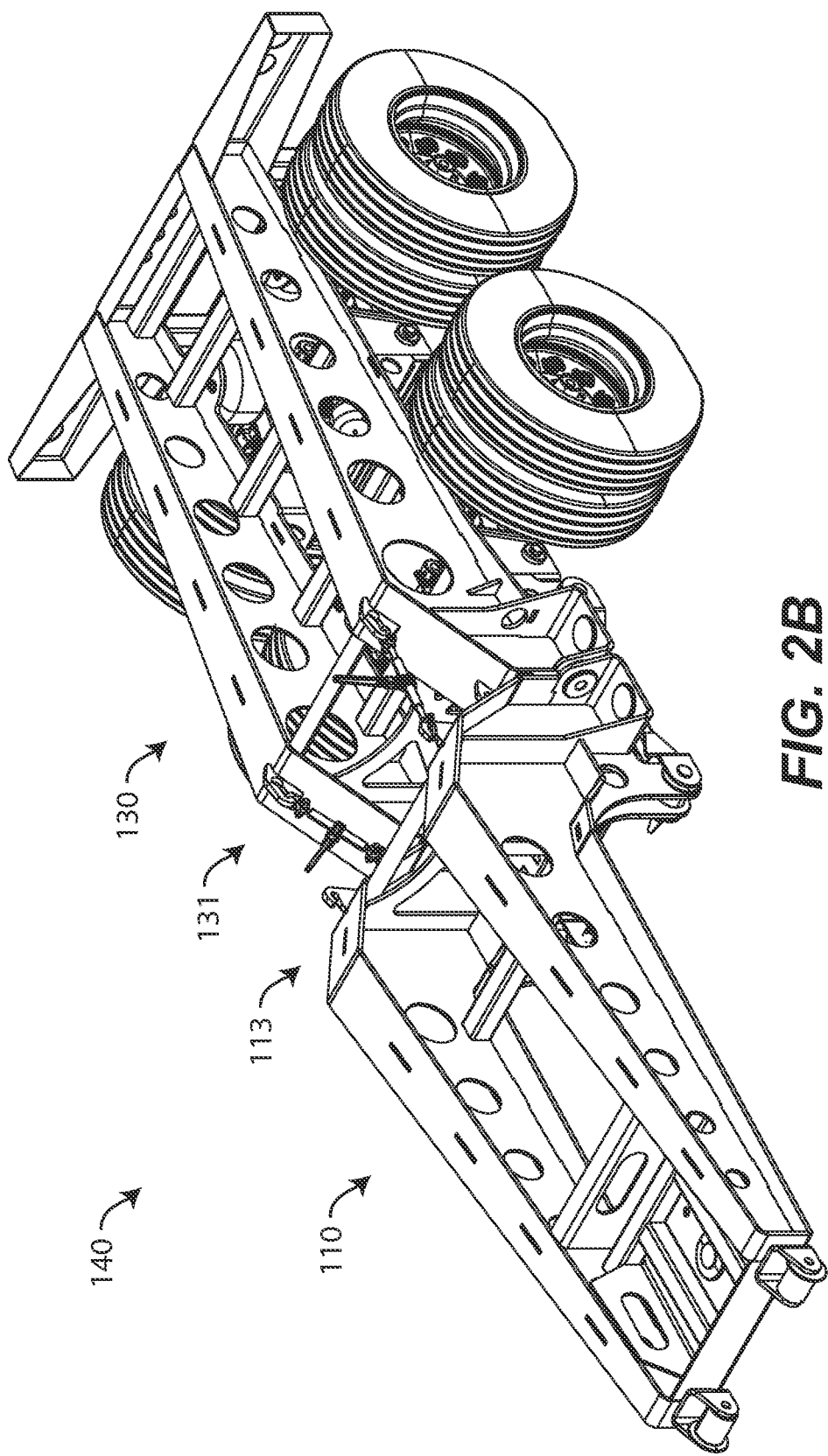

In certain other embodiments, gooseneck connector 113 is adapted to be connected directly to dolly connector 131. Thus, for example, FIG. 2A is a side view of the trailer system 100 of FIG. 1A in a third configuration 100C, where the gooseneck 110 and dolly 130 are connected directly to each other (that is, gooseneck connector 113 is attached to dolly connector 131) to form a dolly transport 140, permitting for transport of the gooseneck and dolly separately from deck 120, and FIG. 2B is a perspective view of the trailer of FIG. 2A.

Configuration 100C permits trailer system 100 to leave deck 120 at a location, as shown in FIG. 2A. By separating trailer system 100 components into deck 120 and dolly transport 140, the gooseneck and dolly may be, for example and without limitation: 1) transported elsewhere for storage; or 2) used at a later date to retrieve deck 120, or a different deck; at some later time. In addition, configuration 100C allows the servicing and/or replacement of individual components of trailer system 100.

Details of one embodiment of the components of trailer system 100 will now be described in greater detail.

Figure 3B:
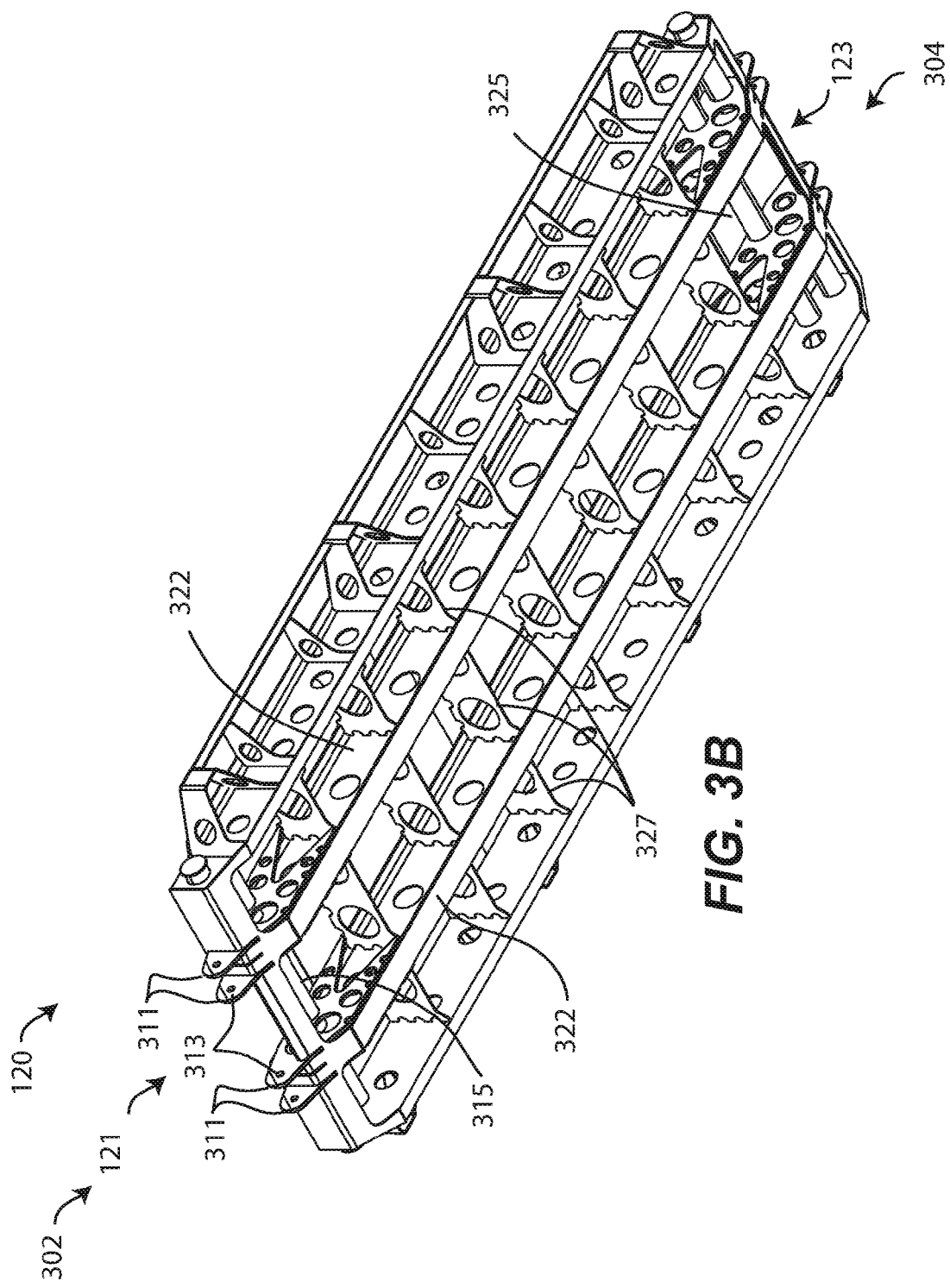

FIGS. 3A-3D are views of deck 120, where FIG. 3A is a top left perspective view, FIG. 3B is a bottom right perspective view, FIG. 3C is a top view, FIG. 3D is sectional side view 3D-3D of FIG. 3C, FIG. 3E is a side view, and FIG. 3F is an end view.

As shown in FIG. 3A, deck 120 has a first deck end 302 that includes deck connector 121 and a second deck end 304 that includes second deck connector 123. An outer skin 301 covers top and bottom surfaces of deck 120. As shown in FIG. 3B, the interior of deck 120 includes structural elements for supporting load L, where the structural elements may be, for example and without limitation, one or more I-beams 322 that extend longitudinally from a first deck end 302 to a second deck end 304, and transverse cross-members 327 that extend between beams 321. Cross tubes 315 and 325, sometimes referred to herein as "cross-members," are joined to structural element 322 by welding, for example, to provide torsional strength to deck 120.

Deck 120 can have any size, but is generally sized for highway transport, and has a length DL from 20 feet to 50 feet and a width DW of from 8 feet to 12 feet, as shown in FIG. 3C.

First deck connector 121 and second deck connector 123 have the same configuration of components. Deck connectors 121 and 123 each include a cross-tube and one or more protruding tabs that facilitate the mating of the deck to gooseneck connector 113 or dolly connector 131. Thus for example, and without limitation, first deck connector 121 includes four tabs 311, each with a hole 313, and cross tube 315. Second deck connector 123 includes four tabs 321, each with a hole 323, and cross tube 325. The sizes and spacing of the elements of connectors 121 and 123 are the same to permit a suitably designed connector to connect to either one of connectors 121 or 123.

In one embodiment, there are four tabs associated with each deck connector: tabs 311a, 311b, 311c, and 311d at deck connector 121 and tabs 321a, 321b, 321c, and 321d at deck connector 123, as shown in FIG. 3F. Tabs 311 and 321 are located symmetrically about the centerline of deck width, as indicated by the distances L1 and S as shown in FIG. 3F. Each one of tabs 311 and 321 has a hole 313 and 323 located a distance A from the tab end, as shown in FIG. 3D. Deck connectors 121, 123 also includes cross tubes 315, 325, which have a diameter of 6 inches and are located a distance B from center of holes 313, 323. FIG. 3D also shows that the centerline of cross tube 315, 325 is a distance T higher than the centerline of the corresponding holes 313, 323. A is approximately 4 inches, B is approximately 20 inches, and T is approximately 2 inches.

Figure 4A:
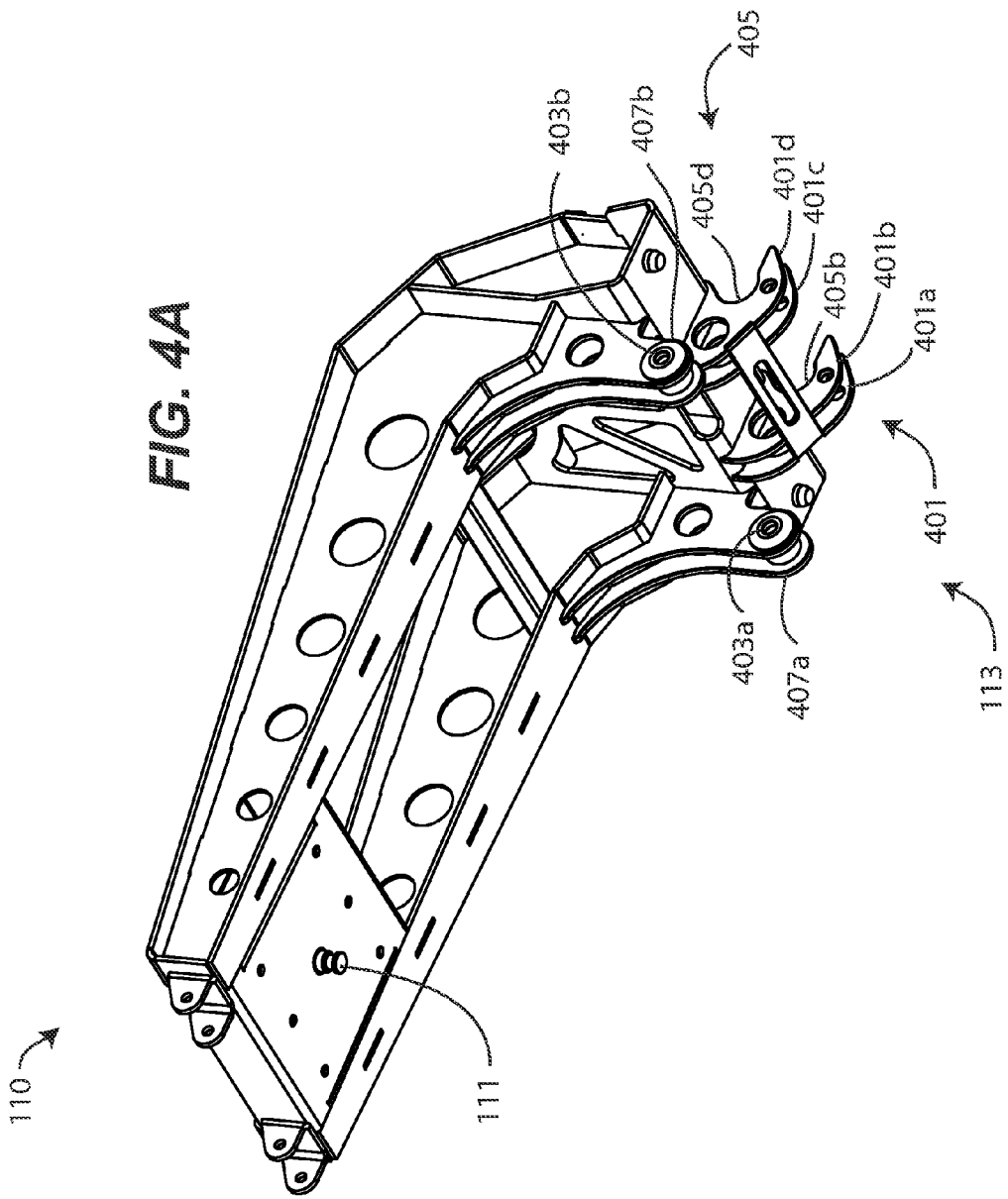
Figure 4B:
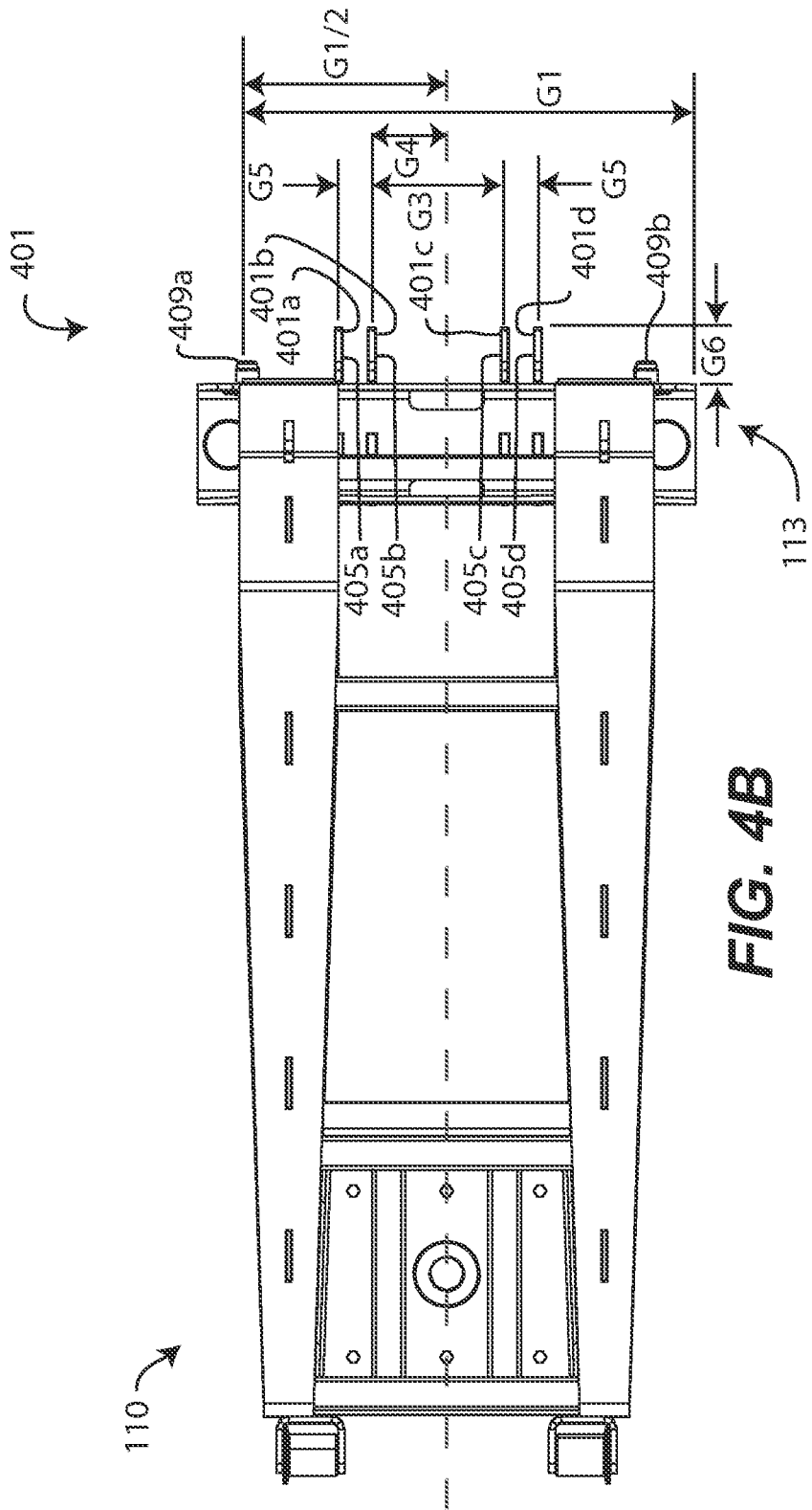
Figure 4E:
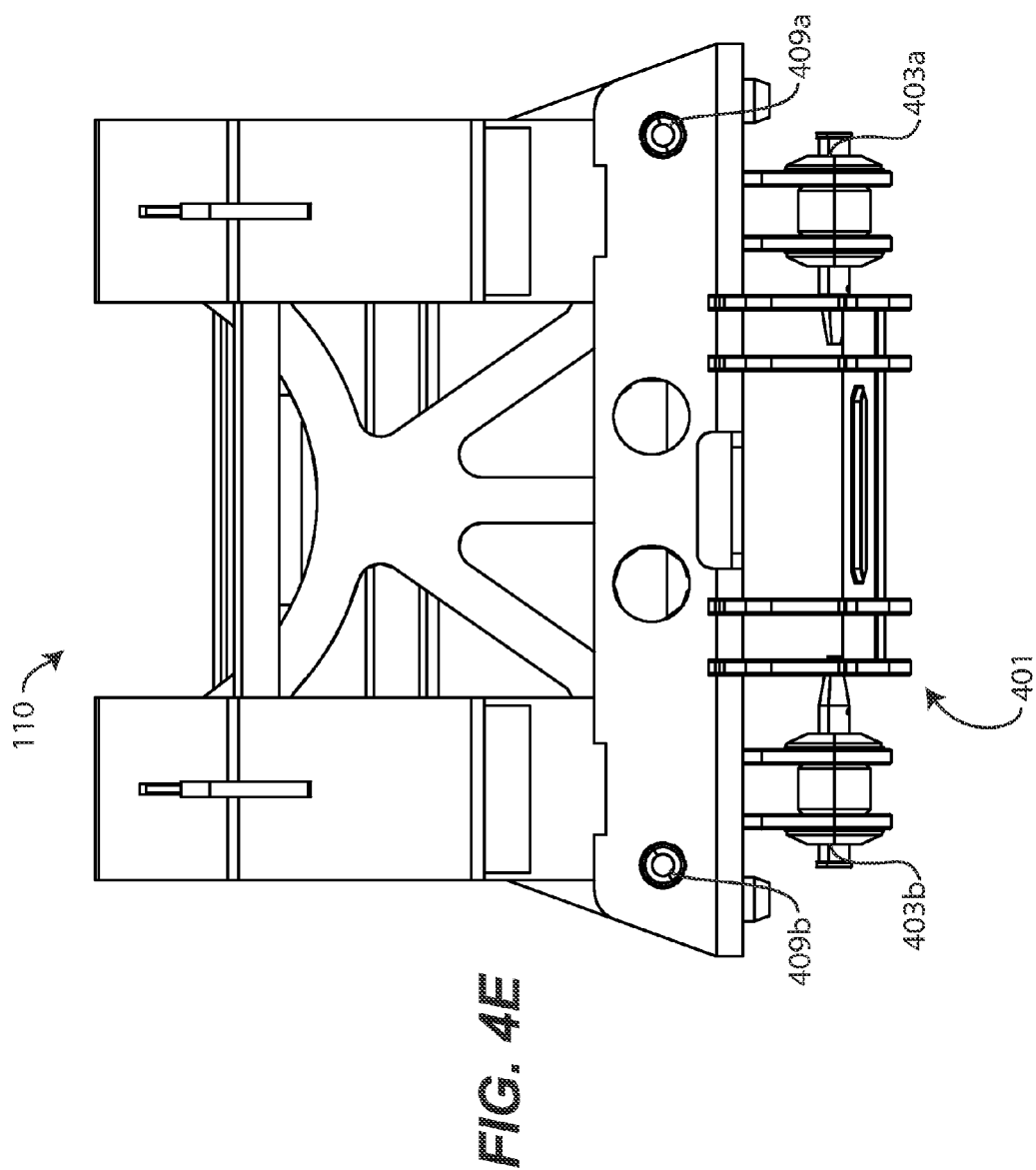

FIGS. 4A-4D are views of gooseneck 110, where FIG. 4A is a bottom perspective view, FIG. 4B is a top view, FIG. 4C is a bottom view, FIG. 4D is a side view, and FIG. 4E is a back view.

Gooseneck connector 113 has a width G1 from which tabs 401 protrude a distance G6. The present invention includes one or more tabs 401. FIGS. 4A-4D illustrate, for example and without limitation, four tabs 401a, 401b, 401c, and 401d, which each have the same shape, shown in side view 4D, including a corresponding surface 405, or specifically 405a, 405*b*, 405*c*, and 405*d*, each having a cross-sectional shape of the arc of a circle with a center C and a radius R. The radius R is the same or slightly larger than the radius of cross tube 315, 325. In an alternative embodiment, for example, gooseneck connector 113 may have only two tabs, which may be for example and without limitation, those indicated as tab 401*a* and 401*c*, or those indicated as tab 401*b* and 401*c*, or may be one tab in a position between tab 401*a* and 401*b* and second tab in a position between tabs 401*c* and 401*d*.

Gooseneck connector 113 also includes a pair of coupling sockets 407*a* and 407*b* (or collectively, coupling socket 407) each having a corresponding hole 403, shown and holes 403*a*, 403*b*, which have approximately the same diameter as holes 313, 323. The distance from the center of holes 403 to the center C is B, matching the hole to cross tube distance of deck connectors 121, 123, and the height difference T between the center of holes 403 and center C match the height difference T between the center of holes 313, 323 and the center of the corresponding cross tube 315, 325. Gooseneck 110 also includes a pair of pins 409, shown and pin 409*a* and 409*b*, that are used in forming dolly transport 140, as described subsequently.

FIG. 4B also shows that the tabs 401 are distributed unevenly about the center of gooseneck 110. The distance G5 between tabs 401*a* and 401*b* is the same as the distance between 401*c* and 401*d*. The distance between the innermost tabs (tab 401*b* and 401*c*) is equal to G3, which tab 401*b* a distance G4 from the centerline. In one embodiment, G1=48 inches, G3=16 inches, G4=9 inches, G5=4 inches, and G6=7 inches.

Gooseneck connector 113 can thus mate with either one of deck connector 121 or 123 by placing one of cross tube 315, 325 within surfaces 405 of each of tabs 401, and aligning holes 403 with holes 313 or 315. As described subsequently, pins may then be placed through the aligned pinholes to secure gooseneck 110 with deck 120.

Figure 5B:
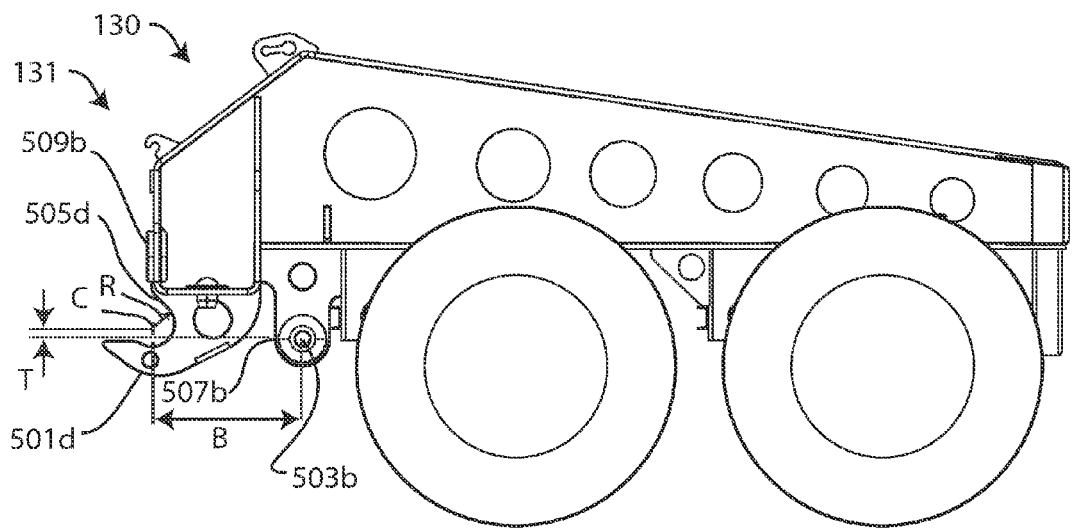
Figure 5C:
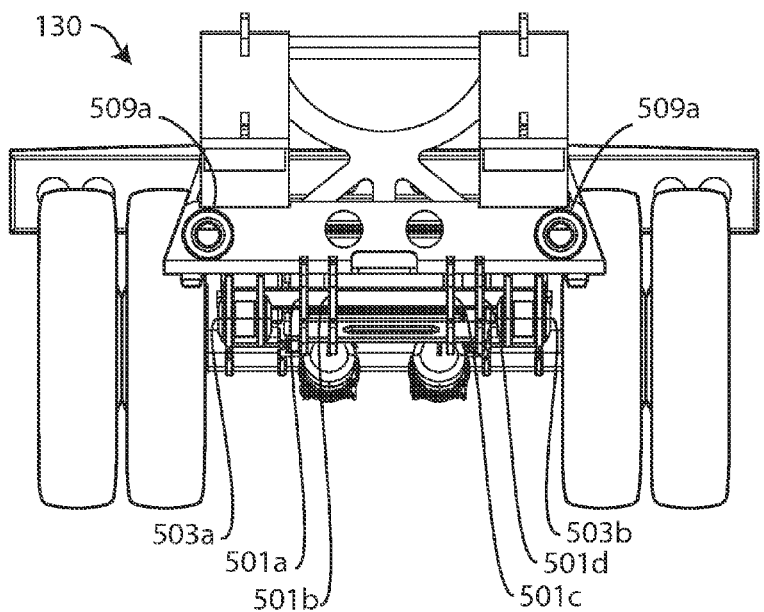

FIGS. 5A-5D are views of dolly 130, where FIG. 5A is a bottom perspective view, FIG. 5B is a side view, FIG. 5C is a front view, and FIG. 5D is a bottom view.

Dolly connector 131 is generally similar to gooseneck connector 113. Dolly connector 131 has a width D1 from which tabs 501 protrude a distance G6. The present invention includes one or more tabs 501. FIGS. 5A-5D illustrate, for example and without limitation, four tabs 501 as tabs 501*a*, 501*b*, 501*c*, and 501*d*, which each have the same shape, shown in side view 5B, including a surface 505 having a cross-sectional shape of the arc of a circle with a center C and a radius R. In an alternative embodiment, for example, dolly connector 131 may have only two tabs, which may be for example and without limitation, those indicated as tab 501*a* and 501*c*, or those indicated as tab 501*b* and 501*c*, or may be one tab in a position between tab 501*a* and 501*b* and second tab in a position between tabs 501*c* and 501*d*.

For each tab 501, the radius of surface 505 similar to that of surface 405 is the same or slightly larger than the radius of cross tube 315, 325. Dolly connector 131 also includes a pair of coupling sockets 507*a* and 507*b* (or collectively, coupling socket 507) each having a corresponding hole 503, shown and holes 503*a*, 503*b*, which have approximately the same diameter as holes 313, 323. The distance from the center of holes 503 to the center C is B, matching the hole to cross tube distance of deck connectors 121, 123, and the height difference T between the center of holes 403 and center C match the height difference T between the center of holes 313, 323 and the center of the corresponding cross tube 315, 325. Dolly 130 also includes a pair of recesses 509, shown and recess 509*a* and 509*b*, that are used in forming dolly transport 140, as described subsequently.

FIGS. 6A-6F are views of the trailer system of FIG. 1A or 1C, where FIG. 6A is a disassembled trailer system, and FIGS. 6B and 6C are side views illustrating the gooseneck and dolly being attached to the deck, FIG. 6D is a side view of the trailer system being attached to a tractor, FIG. 6E is a bottom view 6E-6E of FIG. 6D of the attached gooseneck and deck, and FIG. 6F is a bottom view 6F-6F of FIG. 6D of the attached deck and dolly.

As shown in FIG. 6A, assembly of configuration 100A or 100B may be accomplished starting with gooseneck 110, deck 120, and dolly 130 on the ground, with gooseneck connector 113 near deck end 121 (or 123), and dolly connector 131 near the opposite deck end. As shown in FIGS. 6B and 6C, gooseneck 110 is rotated so that tabs 401 move under cross tube 315 (or 325) such that surface 405 engages the cross tube. Also shown in FIGS. 6B and 6C is the rotation of dolly 130 such that tabs 501 move under cross tube 325 (or 315) such that surface 505 engages the cross tube.

By rotating the raised end of gooseneck 110 relative to dolly 130, as shown in FIG. 6C raises deck 120, holes 313, 403, and 503 come into alignment. Pins may then be placed through the holes to secure gooseneck 110, deck 120, and dolly 130. Thus for example, at gooseneck connector 113 and deck connector 121 (or 123), a first pin (not shown) may be inserted through holes 403*a* and 313*a* (or 315*a*), and a second pin 613 may be inserted through holes 403*b* and 313*b* (or 315*b*), as show in FIGS. 6D and 6E. In addition, at dolly connector 131 and deck connector 123 (or 121), a third pin (not shown) may be inserted through holes 503*a* and 315*a* (or 313*a*), and a fourth pin 617 may be inserted through holes 503*b* and 313*b* (or 315*b*), as show in FIGS. 6D and 6F. The assembled configuration 100A or 100B may then be connected to truck 12, as shown in FIG. 6D.

One method of facilitating the assembly illustrated in FIGS. 6A-6F is to use a crane (not shown) to balance, rotate, and move gooseneck 110 and dolly 130 as shown. It may also be necessary to lift up slightly on deck 120 to align holes 313, 315, 403, and 503 for inserting the pins 611, 613, 615, and 617.

Gooseneck 110, deck 120, and dolly 130 may be disassembled by reversing this procedure.

Figure 7B:
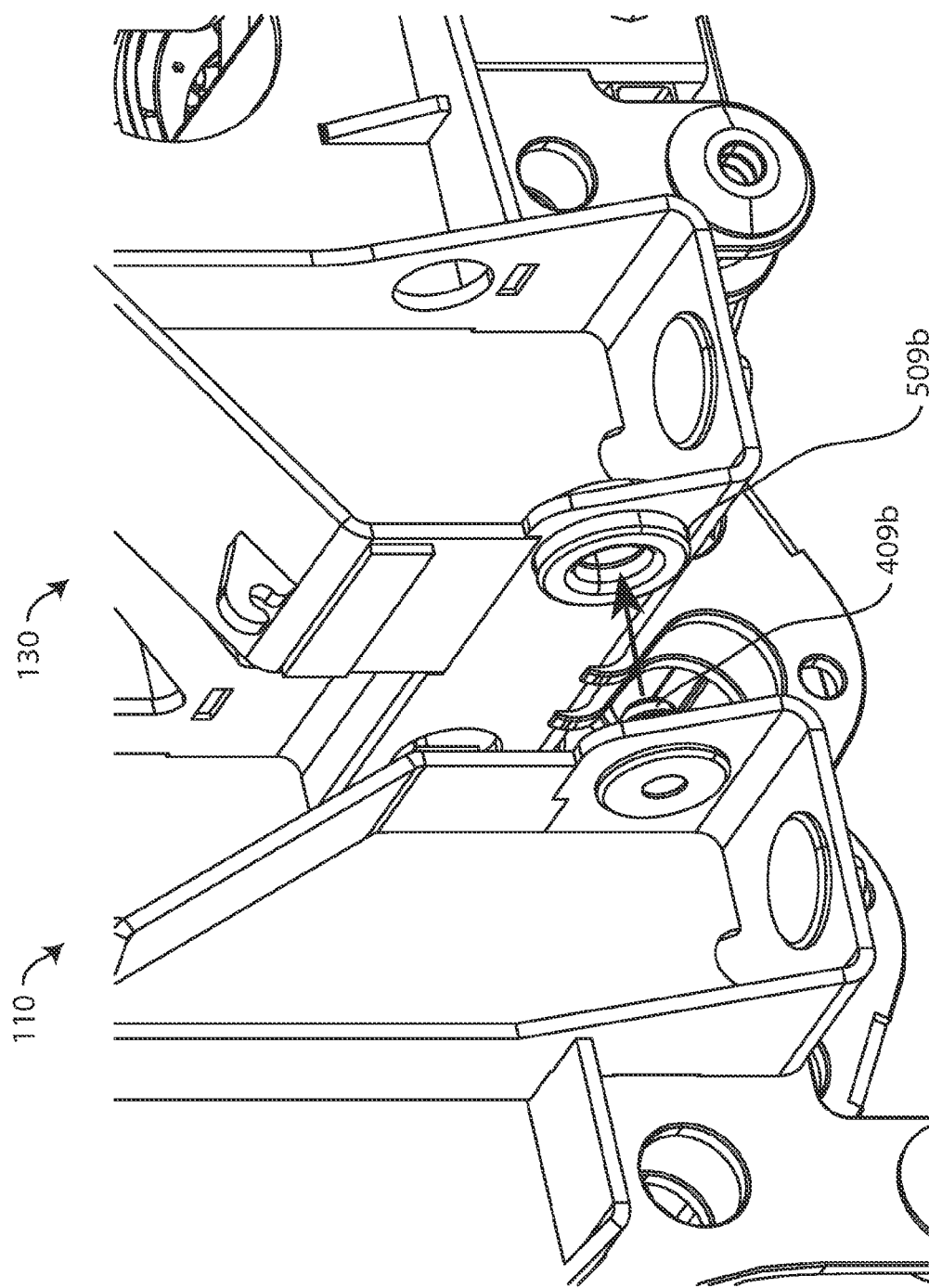
Figure 7D:
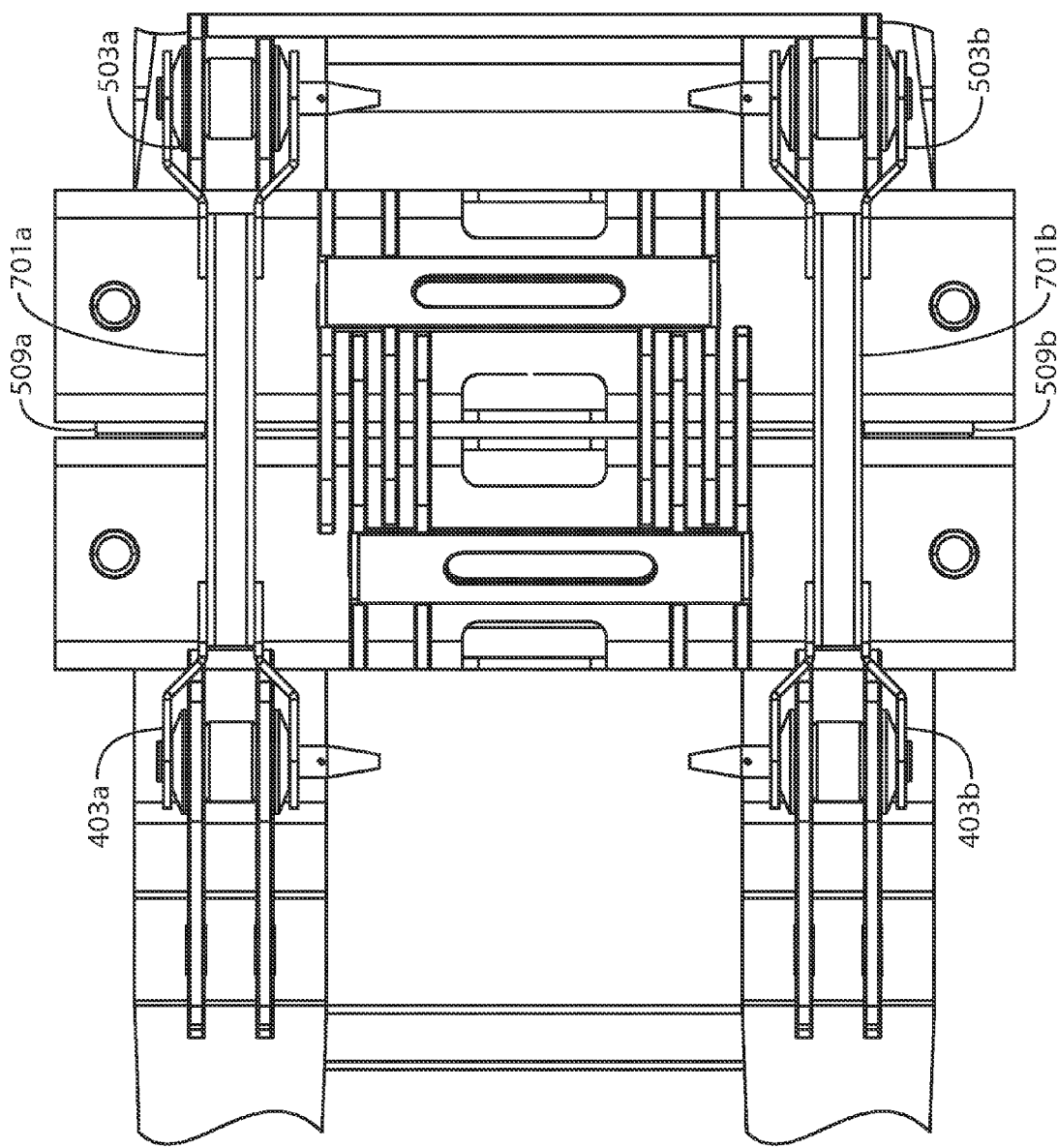

FIGS. 7A-7D are views of the third configuration of FIG. 2A, where FIG. 7A is a side view illustrating connecting the gooseneck and dolly, FIG. 7B is a front left perspective view illustrating connecting the gooseneck and dolly, FIG. 7C is a detailed view of FIG. 2B, and FIG. 7D is bottom view 7D-7D of FIG. 7C of the attached gooseneck and dolly.

By moving gooseneck connector 113 towards dolly connector 131, as shown in FIG. 7A, tabs 401 move into the dolly connector and tabs 501 move into the gooseneck connector. Further movement, as shown in FIG. 7B, causes pin 409*a* to rest inside recess 509*a* and pin 409*b* to rest inside recess 509*b*. Next, as shown in FIGS. 7C and 7D, a linkage 701*a* is used to connect hole 402*a* and 503*a* and a linkage 701*b* is used to connect hole 402*b* and 503*b*, and a ratchet binder 703 is used to connect the top portions of gooseneck connector 113 towards dolly connector 131, forming dolly transport 140. Electrical and air connections may then be made.

Reference throughout this specification to "certain embodiments," "one embodiment" or "an embodiment" means that a particular feature, structure or characteristic described in connection with the embodiment is included in at least one embodiment of the present invention. Thus, appearances of the phrases "in certain embodiments," "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A modular trailer system comprising:
   a deck including:
      a first deck end,
      a second deck end, and
      a rectangular structure for supporting a load on the deck, where said rectangular structure includes
         two or more longitudinal structural elements extending along the length between said first deck end to said second deck end,
         a first cross-member located near said first deck end, where said first cross-member is welded to at least two of said two or more longitudinal structural elements, and
         a second cross-member located near said second deck end, where said second cross-member is welded to at least two of said two or more longitudinal structural elements;
   a gooseneck including a hook, where said hook of said gooseneck is removably connectable to said first cross-member when placed under said first cross-member; and
   a dolly including a hook, where said hook of said dolly is removably connectable to said second cross-member when placed under said second cross-member,
   such that when said gooseneck is connected to said first cross-member and when said dolly is connected to said second cross-member, the weight of said deck is supported by said hook of said gooseneck and said hook of said dolly,
   where at least a portion of said first cross-member and said second cross-member have a cross-sectional shape of the arc of a circle;
   where said hook of said gooseneck has a surface with a cross-sectional shape of the arc of a circle; and
   where said hook of said dolly has a surface with a cross-sectional shape of the arc of a circle.

2. The modular trailer system of claim 1, where said hook of said gooseneck is removably connectable to either said first cross-member when placed under said first cross-member or said second cross-member when placed under said second cross-member.

3. The modular trailer system of claim 1, where said hook of said dolly is removably connectable to either said first cross-member when placed under said first cross-member or said second cross-member when placed under said second cross-member.

4. The modular trailer system of claim 1, where said gooseneck and said dolly are removably connectable to each other.

5. The modular trailer system of claim 1,
   wherein said at least a portion of said first cross-member is accessible through the deck, and
   wherein said at least a portion of said second cross-member is accessible through the deck.

6. The modular trailer system of claim 1, where said two or more longitudinal structural elements are I-beams.

7. The modular trailer system of claim 1, where said first cross-member and said second cross-member are tubes.

8. A deck for attaching to a hook of a dolly and a hook of a gooseneck, said deck comprising:
   a first deck end,
   a second deck end, and
   a rectangular structure for supporting a load on the deck, where said rectangular structure includes
      two or more longitudinal structural elements extending along the length between said first deck end to said second deck end,
      a first cross-member located near said first deck end, where said first cross-member is welded to at least two of said two or more longitudinal structural elements, and
      a second cross-member located near said second deck end, where said second cross-member is welded to at least two of said two or more longitudinal structural elements;
   where at least a portion of said first cross-member has a cross-sectional shape of the arc of a circle accessible through said first deck end, and where at least a portion of said second cross-member has the same cross-sectional shape of the arc of a circle as said portion of said first cross-member and is accessible through said second deck end,
   such that said portion of said first cross-member and said portion of said second cross-member present the same shape for connecting to the hook of the dolly or the hook of the gooseneck.

9. The deck of claim 8, where said two or more longitudinal structural elements are I-beams.

10. The deck of claim 8, where said first cross-member and said second cross-member are tubes.

* * * * *